Figure 3:
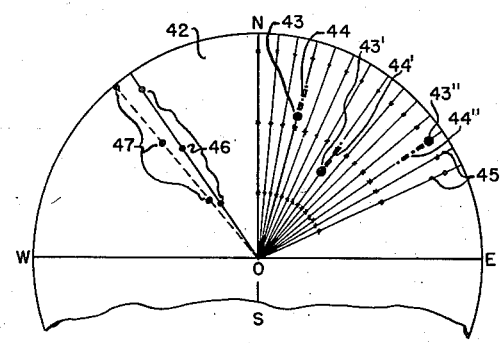

Oct. 19, 1954
W. A. HUBER
2,692,381
RADAR TARGET DESIGNATION SYSTEM
Filed Dec. 4, 1950
3 Sheets-Sheet 1
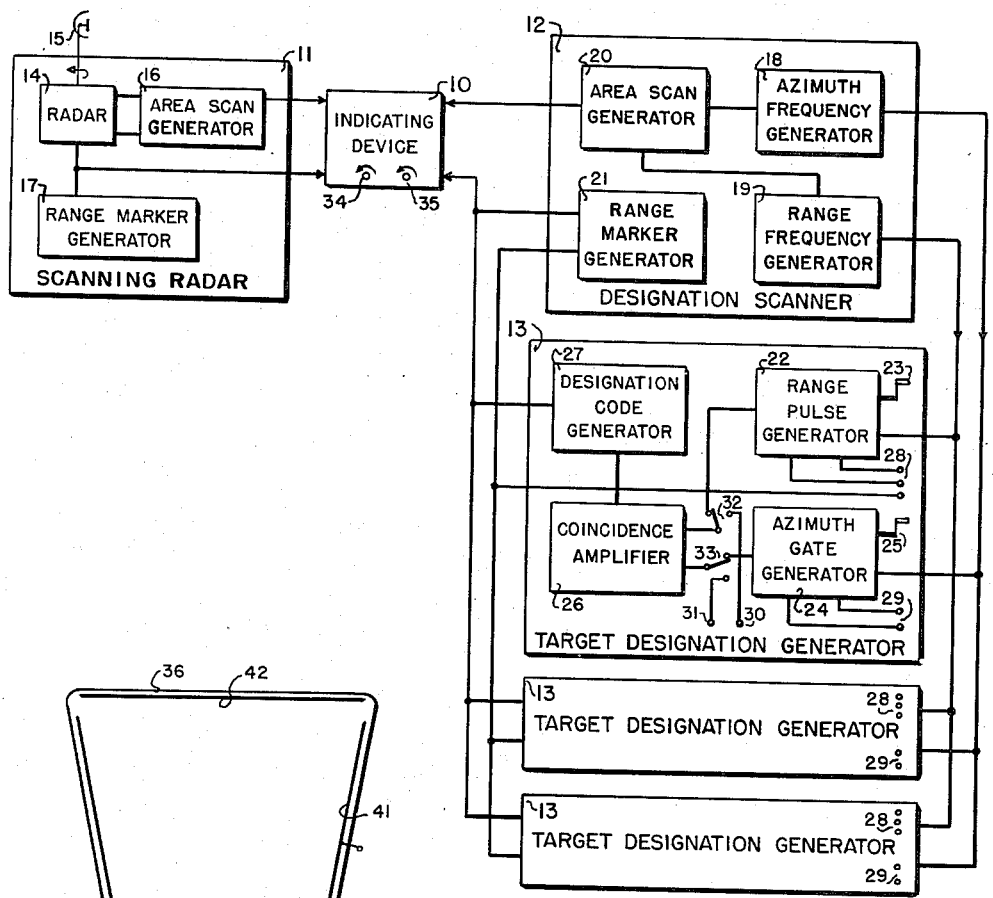
FIG. I.
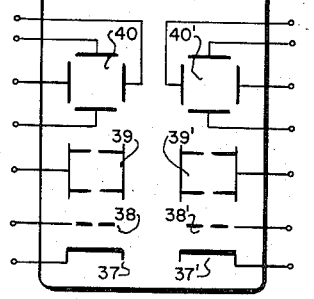
FIG. 2.
INVENTOR.
WILLIAM A. HUBER
BY
Harry M. Saragovitz
Attorney Oct. 19, 1954  W. A. HUBER  2,692,381

RADAR TARGET DESIGNATION SYSTEM

Filed Dec. 4, 1950  3 Sheets-Sheet 2

INVENTOR.
WILLIAM A. HUBER
BY
Harry M. Saragovitz
Attorney

INVENTOR.
WILLIAM A. HUBER

Patented Oct. 19, 1954

2,692,381

UNITED STATES PATENT OFFICE 2,692,381

RADAR TARGET DESIGNATION SYSTEM

William A. Huber, Spring Lake, N. J., assignor to the United States of America as represented by the Secretary of the Army Application December 4, 1950, Serial No. 199,119

17 Claims. (Cl. 343—5)

(Granted under Title 35, U. S. Code (1952), sec. 266)

The invention described herein may be manufactured and used by or for the Government for governmental purposes, without the payment of any royalty thereon.

This invention relates to a radar system for determining the location of a plurality of targets and for designating chosen targets for surveillance at remote points. In particular, the invention relates to a system for coordinating the operations of radar tracking of a plurality of targets.

The gathering and presentation of radar data has been found to be a major problem in present day warfare and a variety of radar organizations, whereby a single command can coordinate the information and relay it to subordinate commands, have been devised. Examples of such organizations will be found in "Radar System Engineering," vol. I, of the Radiation Laboratory Series, McGraw-Hill Book Co., 1947, in section 7, at pages 229 to 242.

Most of the known arrangements for designating the radar targets in such an organized manner have been unsatisfactory, particularly in their ability to quickly and positively assign the surveillance of particular targets to subordinate operators.

Proposals have been made to superimpose a designation signal on the cathode ray screen of an area scanning radar such as one having a plan position indicator (P. P. I.) type of display. This can be accomplished by time sharing electronic circuits, but ordinarily the rate of complete area scanning by the radar is very slow because the antenna structure cannot be turned at a rapid rate and, therefore, rapid designation of targets cannot be accomplished.

It is, accordingly, an object of the present invention to provide a radar system for readily coordinating the operation of a plurality of tracking and gun laying radar stations at a central control point in a manner which avoids many of the disadvantages and limitations of prior art arrangements.

It is an additional object of the invention to provide a radar target designation system having an indicating area wherein target designations may be produced independently of the radar operation.

It is a further object of the present invention to provide at a central location a scanning device for displaying a radar map representation of an area showing target locations and in which area chosen targets can quickly and readily be designated and assigned, together with data defining their location, to the observation of subordinate stations.

It is also an object of the present invention to provide a target designation system wherein a central radar station may be continuously apprised of the operation of subordinate stations in their surveillance of designated targets.

In accordance with the present invention a radar target designation system comprises a line scanning device having an indicating area. A first means responsive to radar operation is provided for scanning this area and producing therein a map representation of a plurality of target locations. A second means, independent of the radar operation, is provided for scanning this area concurrently with the first scanning and at least one generator means operatively controlled by the seceond means is provided for producing in the area a designation signal. The generator means comprises adjusting means for setting the position of the signal in the area in designative relation to a chosen target and means responsive to the setting of the adjusting means are provided for producing data output signals representing the map location of the chosen target.

Also, in accordance with the invention, the system includes means for independently determining the location of the target represented by the data output signals, together with means responsive to the independent determining means for producing input data signals representing the determined location and means for utilizing the data input signals for the adjusting means.

For a better understanding of the present invention, together with other and further objects thereof, reference is had to the following description taken in connection with the accompanying drawings, and its scope will be pointed out in the appended claims.

Figure 5:
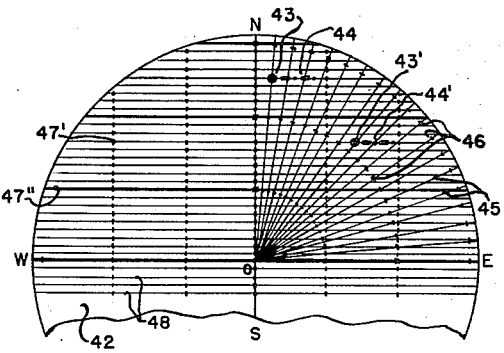
Figure 4:
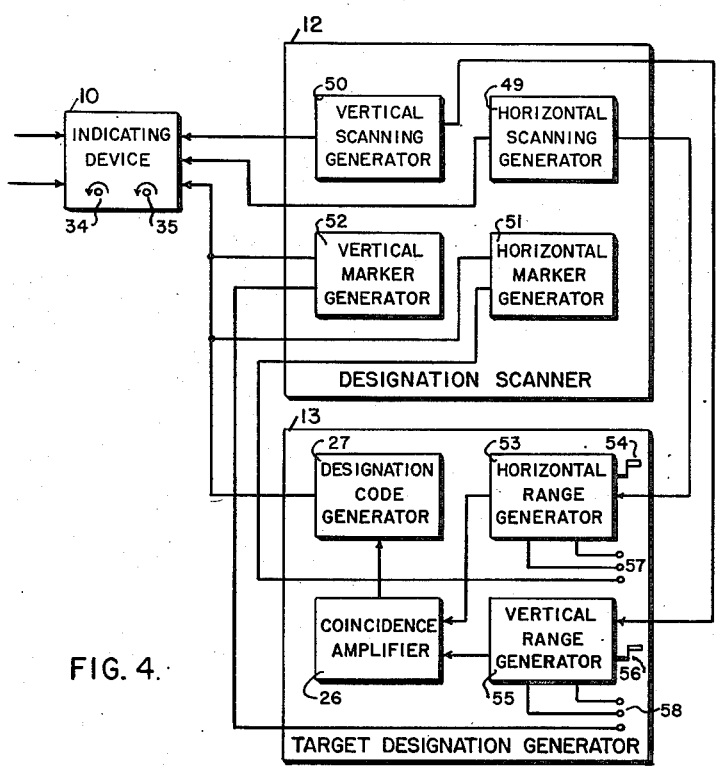
Figure 6:
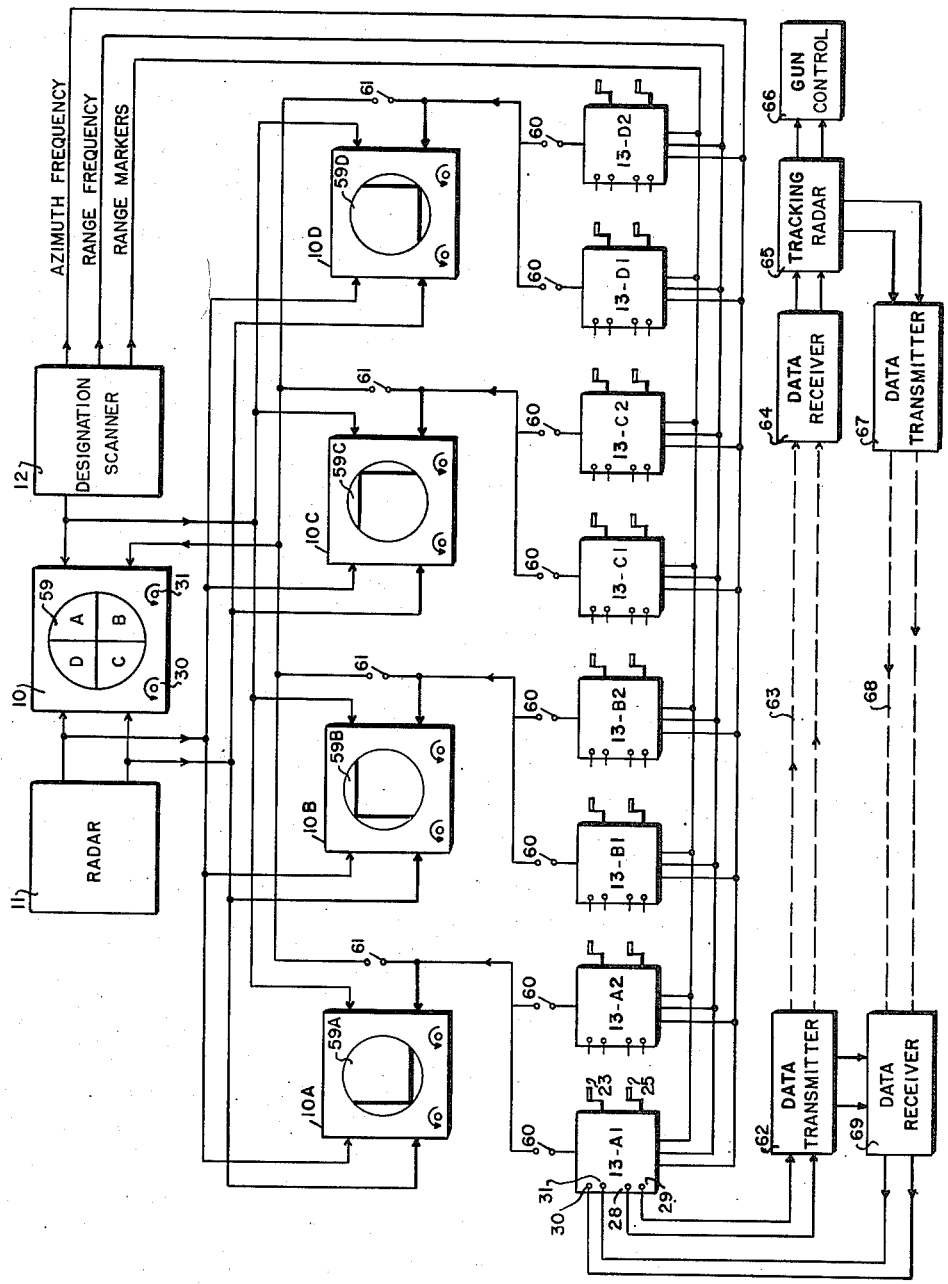

In the accompanying drawings Fig. 1 is a block diagram illustrating the fundamental arrangement of a radar target designation system in accordance with the present invention; Fig. 2 is a diagram drawing illustrating a dual channel cathode ray tube as a preferred form of indicating device; Fig. 3 is an illustration of one form of display provided by the indicating device; Fig. 4 is a block diagram of a part of the system of Fig. 1, showing an alternative arrangement of the target designation system; Fig. 5 is an illustration of the display provided by the indicating device when the operation is modified by employing the Fig. 4 alternative arrangement; and Fig. 6 is a block diagram illustrating the coordination of the target designation system of Fig. 1 in a complete radar control system.

Referring now more particularly to Fig. 1, the target designation system employs a dual channel indicating device 10. To one channel of device 10, scanning potentials and video radar signals are supplied from a search or scanning radar 11. To the other channel of device 10, scanning potentials independent of radar operation are supplied from a designation scanner 12, and designation signals are supplied from a plurality of target designation generators, each labeled 13. The scanning radar unit 11 is divided into a radar circuit unit 14 which is coupled to a search antenna system 15. Timing pulse potentials from 14 are coupled to an area scan generator 16 and video output signals from 14 are coupled to one channel of the indicating device 10. The output of the area scan generator 16 is also coupled to the one channel of indicating device 10. Scanning radar 11 also includes a range marker generator 17, the output of which is likewise coupled to the one channel of the indicating device 10. The designation scanner unit 12 includes an azimuth frequency generator 18 and a range frequency generator 19, the outputs of which are coupled to an area scan generator 20. The output of the generator 20 is coupled to a second channel of indicating device 10. Included as a unit of the designation scanner 12 is a range marker generator 21, the output of which is coupled to the second channel of indicating device 10. The plurality of target designation generators, 13, as shown for one of the units, are each comprised of a range pulse generator 22, having a delay control 23, and an azimuth gate generator 24, having a delay or phase control 25. An output of azimuth frequency generator 18 is coupled to the input of 24 and an output of range frequency generator 19 is coupled to the input of 22. An output of 22 is coupled to an input of coincidence amplifier 26, via switch 32 and an output of 24 is also coupled to a second input of 26 via switch 33. The output of 26 is coupled to the input of a designation code generator 27 and the output of 27 is coupled to an input of the second channel of device 10. Two output terminals of range pulse generator 22, together with an output terminal from the range marker unit 21, are labeled 28. These three terminals together comprise a source of data signals which represent the range of a designated target. A delay adjustment control knob 23, for generator 22, is provided to set the range of the target designation signal. Two output terminals from azimuth gate generator are labeled 29. These two terminals together comprise a source of data signals representing azimuth of a designated target and the phase adjustment control 25 is provided to set the azimuth of the target designation signal. A pair of input terminals 30 and 31 are also provided so that data signals from an external source may be applied to the input of coincidence amplifier 26 via the switches 32 and 33.

Considering now in more detail the functioning of the units of the system and the operation of the system as a whole, it will be assumed that the indicating device 10 is comprised of a dual channel cathode ray tube 36 as shown in Fig. 2. For an understanding of the operation of the system, reference will be made to the display on the cathode ray screen illustrated in Fig. 3.

The scanning radar 11 is here assumed to be of the plan position indicator (P. P. I.) type to provide a map representation of a plurality of targets within the range of the scanning radar. Thus the antenna structure indicated as 15 is here assumed to rotate at a uniform rate and the circuits within the unit 14 are adapted for pulse radar operation. The scanning output of 14, accordingly, supplies to the area scan generator 16 a linear range sweep potential and a circular sweep potential synchronous with the rotation of the antenna 15. The output of 16, therefore, provides in known manner electrostatic scanning potentials to the set of deflection plates 40 of cathode ray tube 36. Area scanning generators of the type here contemplated are discussed in the book "Radar System Engineering," above referred to, at pages 534 to 538.

Referring to Fig. 2, the tube 36 is conventionally shown as comprising a dual gun and electrostatic deflection system comprising a pair of cathodes 37, 37', a pair of control grids 38, 38', a pair of first anodes 39, 39', and pairs of vertical deflection plates and horizontal deflection plates 40, 40'. A second anode 41 is common to the pairs of electron guns and deflectors so that independent cathode ray beams from two sources are provided which focus at and impinge upon the fluorescent indicator screen 42. The arrangement thus far described is such that the scanning potentials from generator 16 provides a P. P. I. scan via the set of deflecting plates 40 and the video signal from radar unit 14 is applied to the control grid 38 of the electron gun system. It will be clear, therefore, that scanning radar 11 together with one channel of tube 36, that is, one electron gun and set of deflection plates, comprises a first means for scanning an indicating area 42 and producing therein a map representation of a plurality of radar echoes or target locations. Power sources and operating potentials and their connections have been omitted since the art thus far described is so well known that such description is deemed unnecessary. For example, the usual means for centering the display by adjustment of suitable bias potentials is indicated simply by the adjusting knobs 34 and 35 for each channel of the indicator unit 10.

The designation scanner 12 provides a second means independent of the radar operation for scanning the area of the fluorescent screen 42 concurrently with the radar scanning. This scanning in our present example will also be assumed to be a P. P. I. scan, but operating at a completely and arbitrarily different rate from that of the radar scanning. Thus, the range frequency generator 19 generates a sawtooth sweep potential to provide a linear range scale at a chosen repetition rate and the azimuth frequency generator 18 provides a circular scanning potential which is arbitrarily different and generally at a much higher rate than the physical rotation of the radar antenna system 15. The outputs of these generators are applied to the area scan generator 20 and therein are intermodulated to provide P. P. I. scanning potentials which, in turn, are applied to the deflection plates 40' of tube 36. The cathode ray beam produced by the right-hand gun is therefore caused to scan the indicating area 42 simultaneously with the radar scanning, but at an arbitrarily different rate of rotation and range.

A pulse voltage output from range generator 19 recurrent at the generator's repetition rate and which is coincident with the start of each range designation scanning line is applied to the input of the range pulse generator 22. The output of range pulse generator 22, which is applied to the input of coincidence amplifier 26, is a pulse wave which may be adjusted to any point along the range line in accordance with the setting of the knob 23. Generator 22, may, for example, be a form of the well known "phantastron delay circuit" which provides a linear time delay of the output pulse relative to the input pulse of any chosen value as determined by the setting of a bias voltage. This bias voltage may be controlled by the setting of knob 23 by any known means. An example of a phantastron linear time delay circuit is shown in the volume "Radar System Engineering," referred to above, at page 500.

In an analogous manner, the azimuth frequency generator 18 is arranged to provide a sinusoidal voltage having a phase which corresponds to a reference azimuth direction of the independent circular scan. This voltage is applied to the input of the azimuth gate generator 24. The azimuth designation gate generator 24 comprises a phase shifting unit adjustable by the setting of control knob 25 and a wide pulse generator actuated by the phase shifter output to provide an output gate pulse; recurrent at the sinusoidal frequency, during the scanning of any chosen azimuth. The gate pulse is applied via switch 33 to an input of coincidence amplifier 26. The length of the azimuth gate will ordinarily be at least for the duration of a range line. Accordingly, the output of coincidence amplifier 26 is a range pulse which can be set by knob 23 at any chosen range and by knob 25 at any chosen azimuth. In operation, the grid 38' will be biased to cut off the ray so that no electrons strike the screen unless there is an output pulse from coincidence amplifier 26. It will be clear, therefore, that if the output pulse from coincidence amplifier 26 were directly applied to the grid 38' of tube 36, the ray would be modulated and a designation mark or spot would appear on the screen 42 and could be adjusted in azimuth and range to coincide with any chosen radar target.

It is not sufficient, however, merely to be able to position a spot on the indicating device in coincidence with any chosen target, since to do this with each of the plurality of designation generators 13 for a corresponding plurality of targets would give no information as to which of the units 13 corresponded with a particular target. Accordingly, the pulse output of coincidence amplifier 26 is applied to the input of the code designation generator 27. This unit may be of any convenient design to produce a Morse code or some type of pulse code sequence which is known to correspond to the particular designation generator 13 from which the code originates. This pulse code is applied to the control grid 38' to modulate the cathode ray and the code representing the unit 13 which is designating a particular target is indicated on the screen 42 following that target as shown in Fig. 3.

In Fig. 3 the indicating area of device 10, which in my example is the fluorescent screen 42 of cathode ray tube 36, is illustrated in part as a circular area having the usual map reference directions north, south, east and west, and a center O corresponding to the radar location. In the NE quadrant, a member of the P. P. I. range lines 45 have been drawn and a plurality of targets are indicated as 43, 43', 43''. Also, on each line the radar range marks are indicated and will here be assumed as indicating range distances of 20, 40 and 60 miles from the origin O. Following the targets 43 and 43', the codes corresponding to the designation generator 13, from which the code originated, are indicated as modulations of the scanning 44 and 44', respectively. For the target 43'' the code indication 44'' is shown as preceding the target and it will be understood by those skilled in the art that this may be accomplished, if desired, by providing a suitable delay of the output pulse from range frequency generator 19 to the input of range pulse generator 22. In the NW quadrant of Fig. 3, a single range line of the radar scan is shown whereon the range marks are labeled 46. Adjacent thereto, in dotted line, a range line produced by the designation scanner is indicated, having thereon equally spaced marker indications labeled 47, which will be referred to presently.

Since the system is to provide data output signals representing the map location of the target, it is not sufficient to produce a designation of a particular target on the indicator screen but data corresponding to the location of the designation signal must also be provided for transmission to a subordinate station; which data will indicate the azimuth and range of the designated target. Since the designation scanner operates at an arbitrarily different rate both in azimuth and in range scanning and since, in my example, both the radar and the designation scanner are of the P. P. I. type, it is first essential that the areas which each scanner traces in polar coordinates shall be placed in registration on the indicating screen. The control knob 35 of the indicator 10, together with control knob 34 serve to center the two polar scannings at a common origin O. The range marker generator 17 of the radar will ordinarily be a pulse generator, of known type, which is triggered to operate synchronously with the scanning of each range line at a repetition rate set to modulate the cathode ray and thereby provide the range mark indications 46. The occurrence of markers in time thus correspond to chosen intervals of distance. Thus, in Fig. 3 the marks labeled 46 correspond to distance intervals from the origin of 20 miles and a total range of 60 miles is indicated. If, for simplicity of explanation, we use for the echo return time the approximate figure of 12 microseconds per mile, then the interval between marker pulses 46 will be 240 microseconds. Generators for the production of marker signals simultaneously with the start of each range sweep are now well known in the radar art, so that further description of generator 17 is deemed unnecessary. It will be evident, however, that for the designation scanner there is no exact correspondence between a range sweep and actual range. Accordingly, the range marker generator 21, while generally similar to generator 17, is designed for a different pulsing rate and is preferably made adjustable as to its rate. In order to produce range marks representing 20 mile intervals, corresponding to those produced by generator 17, the frequency or rate of generator 21 will be adjusted so that the markers which modulate the designation scan will coincide with the markers of the radar scan. Thus in Fig. 3, in the NW quadrant as previously mentioned, a radar range scanning line is shown on which appear the three 20 mile range markers 46 and adjacent thereto, in dotted line, the designation range scanning line produced by generator 20 has three range markers 47 generated by unit 21 which are shown as having a greater spacing than the markers 46. If now the rate of generator 21 is slightly increased, the spacing of markers 47 will be decreased and so can be made to coincide or, more exactly stated, to fall at radial intervals identical with markers 46. It will be clear now that independently of the velocity at which the designation range trace is produced, the adjustment of the frequency of marker generator 21 can be made such that the distance of these markers from the origin will agree with the markers 46 of the radar scan. Alternatively the generator 21 may be left fixed and the amplitude of the sawtooth output from designation scan generator 20 can be increased to change the velocity of the sweep so that the range markers of the designation scanning will agree with the range markers of the radar scanning.

Take as an example a radar 11 having an azimuth rotational rate of 9 cycles per minute and a range scanning rate of the order of 400 lines per second to produce approximately 2,333 lines representing the area and a designation scanner 12 which generates an azimuth rotational rate of, say, 4 cycles per second and a sweep rate of, say, 7,000 cycles per second to produce 1750 lines representing the area. The area is, in each case, scanned by approximately the same number of radial lines; it is not essential or likely that they be the same number. For the radar scanning to produce the display shown in Fig. 3, the tracing of a range line out to the 60 mile marker requires 720 microseconds. Assume now that the designation range line is traced from the origin to the 60 mile mark in 120 microseconds, which is a reasonable setting for the operation of scanner unit 20 for tracing 7000 lines per second. The markers generated by generator 21 should now occur at 40 microsecond intervals to provide coincidence with the radar markers and the pulsing rate of generator 19 would therefore be set at 25,000 cycles. Having first set the range markers as described, it will be clear that when knob 23 is adjusted to time the modulation of the scanning to set the designation signal at a range corresponding to the chosen radar target, a reference pulse corresponding to the start of a range sweep is supplied from one of the terminals 28, a delayed pulse corresponding to the range is supplied by a second terminal of 28, and a scale of range is provided at the third terminal of 28 from the range marker generator 21. Terminals 28, therefore, provide data output signals representing the range of the designated target.

At the terminals 29 sinusoidal voltage of a phase representing a reference azimuth direction, say north, is provided at one terminal and sinusoidal voltage of delayed phase corresponding to the azimuth direction of the designated target is provided at the other terminal. Since one cycle of the azimuth rotational frequency corresponds to 360°, it is unnecessary to provide more data than the sinusoids of reference phase and azimuth phase. The terminals 29, therefore, provide data output signals representing the azimuth of the designated target. Terminals 28 and 29 together provide output data signals representing the map location of the chosen target.

In resume, the radar target designation system described comprises the dual channel line scanning device 10 and the radar 11 provides means for scanning the area periodically at a chosen rate and producing therein a map representation of a plurality of target locations. The term, map representation, means a coordinate representation of the area drawn to a chosen scale. Here the representation is in polar coordinates with range markers providing the scale of distance. The designation scanner 12 provides an independent means for scanning this same area periodically at a second chosen rate and concurrently with the radar scanning and each of the units 13 comprise a generator operatively controlled by the designation scanner for modulating the second scanning to produce in the area a designation signal and each of these generators comprises adjusting means 23 and 25 for timing the modulation to set the position of the designation signal in the area in relation to a chosen target location. Responsive to the setting of these adjusting means the terminals 28 and the terminals 29 provide, periodically at the second chosen rate, data output signals representing to a particular scale the map location of the chosen target.

It may be pointed out here that other methods for providing data signals corresponding to the setting of the adjusting knobs 23 and 25 may be employed. For example, instead of producing electrical data signals at the terminals 28 and 29, direct current data signals may be provided by potentiometers operated by the turning of the control knobs. For this purpose a minimum and a maximum D. C. potential which is linearly divided in accordance with the rotation of the potentiometer would serve to indicate range in accordance with the shaft rotation of knob 25 and to indicate azimuth in accordance with the shaft rotation of the knob 27. In a system of this type, however, the calibration in terms of voltage must be provided in accordance with a predetermined standard which thereby avoids the necessity of transmitting a range or azimuth scale.

In the example given above, where the radar rotational rate is 9 cycles per minute, and the designation rotational rate is 12 cycles per second, it should be pointed out that an important advantage of employing the designation system using the higher rotational rate is that the designation is rapid and not slowed down by having to conform with the slow rate of the radar scanning. With the cathode ray indicators presently employed for P. P. I. displays, there is an additional advantage in the fact that a cascade or double layer screen is used in which a yellow layer having a long brightness decay time is actuated by a blue layer screen having a fast decay time but a quick response to the cathode ray. It has been found that the rapid scanning provided by the designation system of the present invention will ordinarily excite the blue layer to a greater extent than will the slower scanning produced by the radar and the designation signals, therefore, appear with a blue color which renders them easily distinguishable from the targets themselves.

Referring now to Fig. 4, an alternative arrangement of the designation scanner 12 and of the corresponding target designation generator 13 is illustrated. In the previous description the designation scanner provided a P. P. I. type of scan corresponding to a similar type of scan provided by the radar. It will be clear, however, that since the designation circuits scan the area at arbitrarily chosen rates, any type of area scan can be employed for the radar or for the designation units. For example, the designation scanner may employ a linear horizontal scan and, at a lower frequency, a linear vertical scan of the type ordinarily employed in television.

The display for the case where the radar produces a P. P. I. scan and the designation scanner produces an orthogonal type scan, is illustrated in Fig. 5. The modification of unit 12 to produce orthogonical scanning comprises a horizontal scanning generator 49, chosen to provide linear sawtooth scanning potentials of line frequency, and a vertical scanning generator 50, arranged to provide linear sawtooth scanning potentials at field frequency as in television. The sawtooth voltage outputs of these generators are applied directly, one to the horizontal and the other to the vertical, deflection plates 40' of tube 36. A horizontal reference pulse output from generator 49 is applied to the input of horizontal range pulse generator 53 of unit 13 and, similarly, a vertical reference pulse from unit 50 is applied to an input of the vertical range pulse generator 55. The units 53 and 55 will be similar in construction and operation to the unit 22 of Fig. 1 and delay control knobs 54 and 56 operate respectively to provide a horizontal range pulse set in position horizontally as desired and a vertical gate pulse set in position vertically as desired. An output from each of units 53 and 55 is applied to coincidence amplifier 26 and the output of 26 modulate the orthogonal scanning to provide a designation pulse which can be set to correspond to any chosen point in the display area. The pulse output of unit 26 is applied to the input of the designation code generator 27 to provide a code sequence of pulses which is supplied to an input of indicator 10, i. e., to the control grid 38' of tube 36. It will be evident that the code designation signals will now appear as shown in Fig. 5, wherein the targets are again labeled 43, 43' and the code signals 44, 44'. The horizontal scan lines are indicated as 48 and it will be clear that the designation code signals will appear horizontally as shown along horizontal trace lines to the right of the targets which they designate.

Here, again, it is necessary to provide a scale for the designation scanner which corresponds to the actual range scale of the radar. Accordingly, range markers labeled 47', produced by generator 51, are shown indicating 20 mile intervals in the east-west direction. Similarly, range markers 47" provided by marker generator 52 indicate the 20 mile intervals in the north-south direction. These latter markers are of relatively long duration to brighten an entire horizontal line. In a manner similar to that explained in connection with Fig. 1, the frequency of the vertical range mark generator 52 and of the horizontal range mark generator 51 will each be adjusted until these markers correspond with the range marks of the radar in the manner indicated in the drawing of Fig. 5.

As was the case for the range data output signals explained in connection with Fig. 1, horizontal range data signals are supplied at the output terminals 57 of unit 13, consisting of a horizontal range pulse, a horizontal reference pulse and marker pulses which provide the horizontal range scale. Similarly, data signals representing the vertical range of the designated target are provided at output terminals 58 and consist of a vertical range pulse, a vertical reference pulse, and vertical range scale markers. In a manner similar to that pointed out in connection with the Fig. 1 arrangement, the adjusting knobs 54 and 56 may alternatively operate potentiometers or employ some other means of producing data output signals representing the vertical and horizontal components of the designated target location.

Referring now to Fig. 6, the target designation system, as described in Fig. 1, is shown incorporated in a more comprehensive control system. The primary control or command station consists of the search radar 11, the designation unit 10, and the designation scanner 12 which are connected and operate in the manner described in Fig. 1, and so are correspondingly labeled. The indicating device 10 is shown to have a display area 59 which has been marked off into four quadrants: A, B, C and D. Four subordinate designation scanners 10A, 10B, 10C and 10D, are shown and are assumed to be similar to unit 10. Each of these is supplied with scanning potentials and video signals from radar 11 and with the arbitrarily chosen scanning potentials from the designation scanner 12. The screens or displays of each of the subordinate scanners indicated as 59A, 59B, 59C and 59D, are indicated to be centered and adjusted so that each displays an off-center P. P. I. sector scan. Thus 10A displays sector A, 10B displays sector B, etc. Associated with each of the subordinate display devices is a plurality of target designation generators and two are shown for each of the units. Thus designation generators 13-A-1 and 13-A-2 are associated with the display 10A and similarly 13-B-1 and 13-B-2 serve to designate targets in the sector shown by display 10B. The arrangement is similar for displays 10C and 10D. Each of the target designation generators, as in Fig. 1, is supplied with a reference azimuth frequency, a reference range frequency pulse and range markers. A plurality of switches 60 and 61 are shown whereby, for example, generator 13-A-1 may be connected via a switch 60 and adjusted to designate a chosen target on display 10A. Similarly, generator 13-A-2 may be connected and adjusted to designate a second target on display 10A. Either or both of these designation channels may be connected by switch 61 to cause the signals to appear on the display unit 10. The same operation is provided for the other display units 10B, 10C and 10D and any one of the designated targets can be switched to appear on the command display indicator 10.

In an organized system of this type, communication circuits, not shown, will be provided between the command operator at display 10 and the subordinate operators at units 10A, B, C, and D. Thus the command operator may call on any one of the operators to indicate, by connecting his switches 60 and 61, the designations of the particular targets which his designation units have chosen. Each of the designation units as described in Fig. 1 provides data output signals representing the map location of the chosen target and in an organized system the data corresponding to the map location of a chosen target would ordinarily be transmitted to a tracking or gun laying radar so that the remote radar at the gun position can receive data indicating a particular target and thereafter pick up and track that particular target, control the sighting of a gun to train upon that target and return data representing the location of the assigned target to the subordinate and central commands. The arrangement for accomplishing this control is indicated in block diagram in connection with one of the target designation generators, namely 13-A-1.

The range data output signals from terminals 28 of Fig. 1 are here shown for simplicity as being provided from a single terminal 28 to a data transmitter 62 and, similarly, the azimuth data signals from terminals 29 of Fig. 1 are here shown for simplicity as here being provided from a single terminal 29 to an input of the data transmitter 62. Data transmitters and receivers of the type here contemplated are not per se a part of the present invention. A variety of data transmitters and receivers are, however, well known in the art and information relating to their form and their operation will be found in the book "Electronic Time Measurements," Radiation Laboratory Series, McGraw-Hill Book Co., vol. 20, at chapter 11, entitled "Relay Radar Systems," beginning at page 417. Accordingly, a detailed description of the operation of data transmitters and receivers is deemed unnecessary here. The data transmitter 62 converts the input data supplied from terminals 28 and 29 to a suitable form for transmission over a communication path which may be wire or radio to the data receiver 64 at a remote station and there the output of 64 is utilized by the operator of a tracking radar 65 to which the output of 64 is shown as being coupled. The operator of tracking radar 65 utilitizes the received data to orient the antenna and locate the designated target. Thus the radar 65 comprises means for independently determining the location of the designated target. Thereafter the tracking radar independently continues to track the designated signal and output data signals from the tracking radar are indicated as being coupled to a gun control 66 to guide and aim the gun at the designated target. Data signals from tracking radar 65 are supplied to the input of a data transmitter 67 and these data signals representing the determined range and azimuth location are transmitted via the communication circuit 68 back to a data receiver 69. Data transmitter 62 is coupled also to data receiver 69 to provide conversion in unit 69 of the returned data to data signals of the same form as those which were supplied from unit 13-A-1 to the input of 62. It will be evident that this can be accomplished in a number of ways, for example, the data receiver 69 may include units similar to generators 22 and 24, not having adjusting knobs 23 and 25, but in their place employing bias potentials produced by, and having amplitudes determined by, the returned data signals. The output of data receiver 69 is supplied to the terminals 30, 31, of unit 13-A-1. Referring back to Fig. 1, it will be noted that the switches 32 and 33 can be thrown to disconnect units 22 and 24 and instead to connect the terminals 30 and 31 each to an input of coincidence amplifier 26. Since the output of data receiver 69 is similar to that produced by azimuth and range generators 22 and 24, it will be clear that data receiver 69 provides data signals replacing those determined by the adjusting means 23 and 25, namely: a range pulse and an azimuth gate to the coincidence amplifier. Therefore, the output of the coincidence amplifier is a pulse designating the target location as it is now being determined by the distant tracking radar 65. It follows, therefore, that on the radar screen of 10A, and on the command radar screen of indicator 10, the designation signal may be indicated as before, but in this case it is being provided by the distant tracking radar station. Here again, alternative methods may be employed for introducing the designation data directly from the setting of the knobs 23 and 25 to the data transmitter 62 as, for example, by D. C. potentials from potentiometers operated by these knobs. Conversely, the data signal output of data receiver 69 may be of a form to be utilized to operate a selsyn system which will turn these knobs in accordance with the tracking operations of the distant radar station. With such an arrangement the switches 32, 33 and the terminals 30, 31 would be omitted, since the data received from the tracking radar now causes the knobs 23 and 25 to follow its tracking of the designated target. It will be understood that in cases where the distance of the tracking radar 65 from the search radar 11 must be considered, corrections for parallax and time delay will be introduced into the several data transmitter and receiver units in known manner.

While the description has been confined to that of a two dimensional system, it will be evident that where the targets are aircraft the usual corrections for slant to ground range will be made as in general radar practice and that the system may be expanded to include the determination and transmission of data indicating altitude.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A radar target designation system comprising a line scanning device having an indicating area, a first means responsive to radar operation for scanning said area periodically at a chosen rate and producing therein a map representation of a plurality of target locations, a second means independent of said radar operation for scanning said area concurrently with said first scanning and periodically at a second chosen rate and at least one generator means operatively controlled by said second means for modulating said second scanning to produce in said area a designation signal, said generator means comprising adjusting means for timing said modulation to set the position of said signal in said area in designative relation to a chosen target location.

2. A target designation system in accordance with claim 1, which further comprises means responsive to the setting of said adjusting means for producing periodically at said second rate data output signals representing the map location of said target.

3. A target designation system in accordance with claim 2 which further comprises means for independently determining the location of said target represented by said data output signals, means responsive to said independent determining means for producing data input signals representing said determined location and switching means for utilizing said data input signals instead of said adjusting means.

4. A radar target designation system comprising a dual channel line scanning device having an indicating area, a first means including a channel of said device responsive to radar operation for scanning said area periodically at a chosen rate and producing therein a map representation of a plurality of target locations, a second means including a second channel of said device and independent of said radar operation for scanning said area periodically at a second chosen rate higher than said first scanning rate and concurrently with said first scanning and at least one generator means operatively controlled by said second means for modulating said second scanning to produce in said area a designation signal, said generator means comprising adjusting means for timing said modulation to set the position of said signal in said area in designative relation to a chosen target location.

5. A target designation system in accordance with claim 4, which further comprises means responsive to the setting of said adjusting means for producing periodically at said second rate data output signals representing the map location of said target.

6. A target designation system in accordance with claim 5 which further comprises means for independently determining the location of said target represented by said data output signals, means responsive to said independent determining means for producing data input signals representing said determined location and switching means for utilizing said data input signals instead of said adjusting means.

7. A radar target designation system comprising a line scanning device having an indicating area, a first means responsive to radar operation for scanning said area periodically at a chosen rate and producing therein a map representation of a plurality of target locations, a second means independent of said radar operation for scanning said area periodically at a second chosen rate higher than said first scanning rate and concurrently with said first scanning, means for providing a scale relation between said scannings and at least one generator means operatively controlled by said second means for modulating said second scanning to produce in said area a designation signal, said generator means comprising adjusting means for timing said modulation to set the position of said signal in said area in designative relation to a chosen target location, and means responsive to the setting of said adjusting means and to said means for providing a scale relation for producing periodically at said second rate data output signals representing the map location of said target.

8. A target designation system in accordance with claim 7 which further comprises means for independently determining the location of said target represented by said data output signals, means responsive to said independent determining means for producing data input signals representing in accordance with said scale relation said determined location and switching means for utilizing said data input signals instead of said adjusting means.

9. A radar target designation system comprising a line scanning device having an indicating area, a first means responsive to radar operation for scanning in polar coordinates said area periodically at a chosen rate and producing therein a map representation of a plurality of target locations, a second means independent of said radar operation for scanning in polar coordinates periodically at a second chosen rate said area concurrently with said first scanning, means for centering said scannings at a common origin, and at least one generator means operatively controlled by said second means for modulating said second scanning to produce in said area a designation signal, said generator means comprising two independent adjusting means each for timing said modulation to set a coordinate position of said signal in said area in designative relation to a chosen target location.

10. A target designation system in accordance with claim 9, which further comprises means responsive to the setting of said adjusting means for producing periodically at said second rate data output signals representing the map location of said target.

11. A target designation system in accordance with claim 10 which further comprises means for independently determining the location of said target represented by said data output signals, means responsive to said independent determining means for producing data input signals representing said determined location and switching means for utilizing said data input signals instead of said adjusting means.

12. A radar target designation system comprising a line scanning device having an indicating area, a first means responsive to radar operation for scanning said area periodically at a chosen rate and producing therein a map representation of a plurality of target locations, a second means independent of said radar operation for scanning said area periodically at a second chosen rate concurrently with said first scanning and at least one generator means operatively controlled by said second means for modulating said second scanning to produce in said area a designation signal, said designation signal having a characteristic identifying said one generator means, said generator means comprising adjusting means for timing said modulation to set the position of said signal in said area in designative relation to a chosen target location.

13. A target designation system in accordance with claim 12, which further comprises means responsive to the setting of said adjusting means for producing periodically at said second rate data output signals representing the map location of said target.

14. A target designation system in accordance with claim 13 which further comprises means for independently determining the location of said target represented by said data output signals, means responsive to said independent determining means for producing data input signals representing said determined location and switching means for utilizing said data input signals to produce said designation signal.

15. A radar target designation system comprising a dual channel cathode ray tube line scanning device having an indicating area, a first means including a channel of said tube responsive to radar operation for scanning said area periodically at a chosen rate and producing therein a map representation of a plurality of target locations, a second means including a second channel of said tube and independent of said radar operation for scanning said area concurrently with said first scanning and periodically at a second chosen rate and at least one generator means operatively controlled by said second means for modulating said second scanning to produce in said area a designation signal, said generator means comprising adjusting means for timing said modulation to set the position of said signal in said area in designative relation to a chosen target location.

16. A target designation system in accordance with claim 15, which further comprises means responsive to the setting of said adjusting means for producing periodically at said second rate data output signals representing the map location of said target.

17. A target designation system in accordance with claim 16 which further comprisse a radar station for independently determining the location of said target represented by said data output signals, means responsive to said radar station for producing data input signals representing said determined location and switching means for utilizing said data input signals for said adjusting means.

References Cited in the file of this patent

UNITED STATES PATENTS

| Number | Name | Date |
|---|---|---|
| 2,421,747 | Engelhardt | June 10, 1947 |
| 2,422,697 | Meacham | June 24, 1947 |
| 2,471,516 | Bryant | May 31, 1949 |
| 2,489,251 | Anast | Nov. 29, 1949 |
| 2,563,395 | Carpentier | Aug. 7, 1951 |
| 2,589,965 | Rost et al. | Mar. 18, 1952 |
| 2,603,775 | Chipp | July 15, 1952 |
| 2,622,240 | Fleming-Williams | Dec. 16, 1952 |
| 2,624,043 | Gerwin et al. | Dec. 30, 1952 |